Aug. 7, 1951  E. A. LUNDGREN  2,563,258
SECTIONING APPARATUS
Filed Aug. 16, 1949

INVENTOR:
Eric August Lundgren,
BY:
Pierce, Scheffler & Parker,
ATTORNEYS.

Patented Aug. 7, 1951

2,563,258

UNITED STATES PATENT OFFICE 2,563,258

SECTIONING APPARATUS

Eric August Lundgren, Havla, Sweden

Application August 16, 1949, Serial No. 110,549
In Sweden August 20, 1948

3 Claims. (Cl. 33—110)

The present invention refers to apparatus intended to facilitate sectioning of drawings, cross-ruling, making of pattern drawings and the like. It is known in such apparatus to mark the magnitude of the sectioning steps with the aid of a toothed wheel, the teeth of which travel along a surface in engagement therewith, said toothed wheel being arranged on a holder on the ruler, square or the like, with the aid of which the sectioning lines are drawn. Here, the mutual distance of the sectioning lines is determined by the distance between the points of the teeth, the least obtainable distance thus corresponding to the distance between the tooth points. In connection with coarse sectioning, the toothed wheel is caused to turn by an angle corresponding to two or more tooth point distances for each sectioning step.

The present invention has for its object to provide a sectioning apparatus in such manner that the magnitude of the sectioning steps may be varied independently of the distance between the teeth of a toothed wheel. In this connection there is no need for a toothed wheel, the apparatus being instead provided with a roller having a smooth or channelled surface. A toothed wheel may be made use of, however, the pitch of the teeth being then generally kept small.

The substantial distinguishing feature of the invention resides, above all, in that the magnitude of the sectioning steps is determined by an adjusting device adapted controllably to limit the turning angle of the roller, toothed wheel or the like. The adjusting device may be adjusted so that arbitrary sectioning steps are obtained within certain limits, inasmuch as a continuous variation of the sectioning step is provided for. Thus, the distance between the sectioning lines may be adjusted from zero to a maximum value, such as 22 millimeters.

Figure 3:
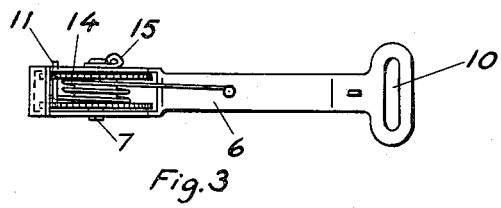
Figure 2:
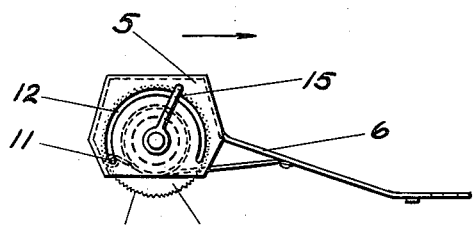
Figure 4:
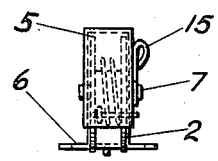
Figure 1:
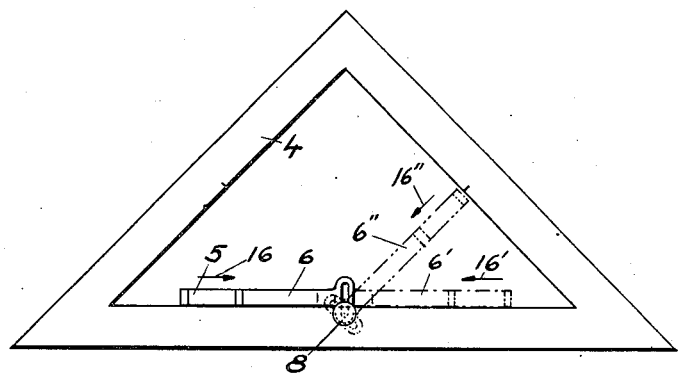
Figure 5:
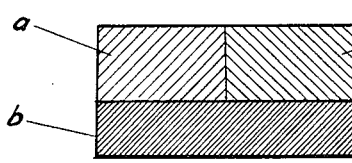
Figure 6:
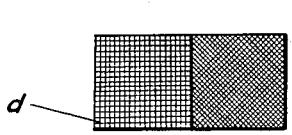

A form of embodiment of the invention will be described in the following with reference to the accompanying drawing, which illustrates an example of applying the invention. Fig. 1 is plan view of the apparatus to a reduced scale, the same being mounted on a triangular set square. Fig. 2 shows the apparatus in elevation to a larger scale. Fig. 3 shows the apparatus viewed from below, and Fig. 4 shows the same viewed from the left in Fig. 2. Figs. 5 and 6 show a few samples of different sectionings performed by means of an apparatus according to the invention.

As shown in the drawing, the apparatus is provided with a roller 2 having a channelled peripheral portion 3 intended to travel along a surface, such as a drawing paper, at the displacement of the triangular set square along which the sectioning lines are being drawn. The roller 2 is arranged in a casing 5, which is open at the bottom and carried by a resilient holder 6 adapted to keep the roller out of engagement with the surface, when the holder is not acted upon and sectioning is not to take place, whereas said holder is intended to yield resiliently, when the roller is to be pressed against the surface during the sectioning operation. The roller 2 is mounted in the casing 5 on a stub shaft 7 fixedly secured in the casing. The roller may be composed of two disks, as shown in Fig. 3, the same being kept together by a hub member. Secured on the roller is a stop cotter 11 projecting through a slit 12 in the side-wall of the casing 5, said slit being formed on the line of a circular arm. Wound about the hub member of the roller is a helical spring 14, one end of which is attached to the holder 6, while the other end thereof is secured to the cotter 11, as shown in Fig. 3. The spring 14 is so arranged as to tend to keep the roller with the stop cotter 11 at one end of the slit 12, that is to say in the position shown in Fig. 2. Arranged on one end of the shaft 7 projecting through the side-wall of the casing is an adjusting arm or pointer 15, which is arranged on the shaft at a firm frictional contact therewith so as to remain in any desired angular position to which it might have been swung about the shaft. The magnitude of the sectioning steps is selected by means of the adjusting arm 15 extending radially past the slit 12. If desired, a scale may be provided behind the slit 12 on the side-wall of the casing, against which the pointer 15 may be adjusted to permit the sectioning steps to be read off.

The mode of operation of the apparatus described is as follows:

In the drawing of lines $a$ having an inclination of 45° in Fig. 5, the holder 6 is preferably turned into the position shown by full-drawn lines in Fig. 1, wherein it is clamped fast by means of the screw 8, which is here located at one end of the elongated aperture 10 of the holder. When a sectioning line has been drawn, the triangular set square is displaced in the direction of the arrow 16 along the horizontal ruler along which the lower edge of the square is conceived as being guided. This displacement is effected with the aid of the apparatus, the roller 2 being brought into engagement with the drawing paper by the casing 5 being depressed by means of a finger, the casing being then moved in the direction of the arrow 16, bringing the square along with it. The roller is thus caused to travel along the drawing paper, the stop cotter 11 thus moving along the slit 12, until it strikes against the adjusting arm 15. The helical spring 14 is strained at the same time. Now, the next sectioning line is drawn, and it is evident that the distance of this line from the first line is determined by the stop cotter 11 and the adjusting arm 15, and corresponds to the turning of the roller. The finger actuating the casing 5 is then raised to a small extent, so that the holder 6, which is formed as a leaf spring, will raise the roller 2 from the paper. The helical spring 14 then turns the roller 2 back into its initial position, wherein the stop cotter checks the rotary movement against the end of the slit 12. The operation described is repeated, exactly equal distances being thus obtained between the sectioning lines, as long as the adjusting arm 15 remains in its position of adjustment. By moving the adjusting arm 15, the distance between the sectioning lines may be varied from zero to a maximum value depending on the size of the roller and the length of the slit 12. The sectioning lines may thus lie very closely, as shown at $b$ in Fig. 5, or wide apart, as at $a$.

If it is desired to obtain sectioning lines of the inclination $c$ in Fig. 5, the holder 6 is swung by a half revolution into the position 6' shown by broken lines in Fig. 1, wherein it may be locked by the screw 8 at the other end of the elongated aperture 10. The square is then displaced by means of the apparatus in the direction of the arrow 16'. If "horizontal" and "vertical" lines are to be drawn, for instance in the form of a cross-ruled net at $d$ in Fig. 6, the holder is adjusted in parallel with one of the catheti of the triangular set square, for instance to the position shown by dash lines 6" in Fig. 1, the square being guided during its displacement in the simplest manner by means of a ruler along one of the catheti in the direction of the arrow 16".

What I claim is:

1. Apparatus to facilitate sectioning and the like of drawings comprising a ruler member adapted to be moved stepwise over a surface upon which the lines are to be drawn, a roller casing having an open bottom and spaced vertical side walls, an axle member extending between said walls, a roller journalled on said axle member between said side walls and projecting below the casing through the open bottom thereof, one wall of said casing having an arcuate slot therein coaxial with said roller, a stop pin projecting from one side of said roller through said arcuate slot and a radially extending adjustable arm intersecting said slot and engageable by said stop pin to limit rotation of said roller in one direction.

2. Apparatus to facilitate sectioning and the like of drawings as defined in claim 1 in which a spring member is provided and connected at one end to said stop pin on said roller to bias the same toward one end of said arcuate slot and a resilient arm is provided for mounting said roller casing on the ruler member with the roller normally out of contact with the surface thereunder, but depressible into contact therewith.

3. Apparatus to facilitate sectioning and the like of drawings as defined in claim 1, including a pivotally adjustable arm for mounting said roller casing on the ruler member whereby to adjust the direction of roller travel with respect to the ruling edge of the ruler member.

ERIC AUGUST LUNDGREN.

REFERENCES CITED

The following references are of record in the file of this patent:

UNITED STATES PATENTS

| Number | Name | Date |
| --- | --- | --- |
| 210,922 | Cousins | Dec. 17, 1878 |

FOREIGN PATENTS

| Number | Country | Date |
| --- | --- | --- |
| 36,831 | Sweden | May 27, 1914 |